J. T. DANIEL.
RAT TRAP.
APPLICATION FILED JULY 1, 1916.
1,222,606.
Patented Apr. 17, 1917.
2 SHEETS—SHEET 1.
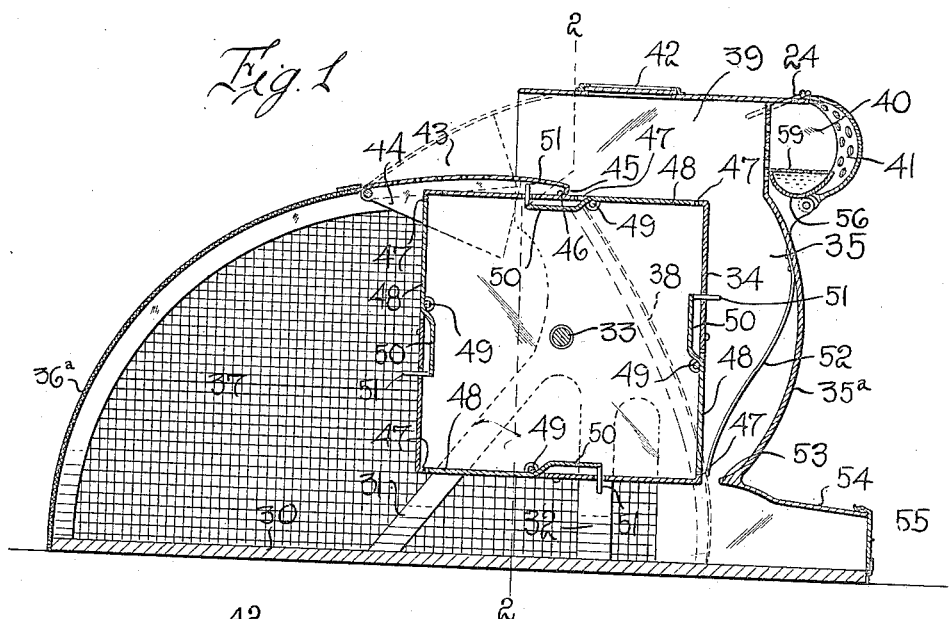
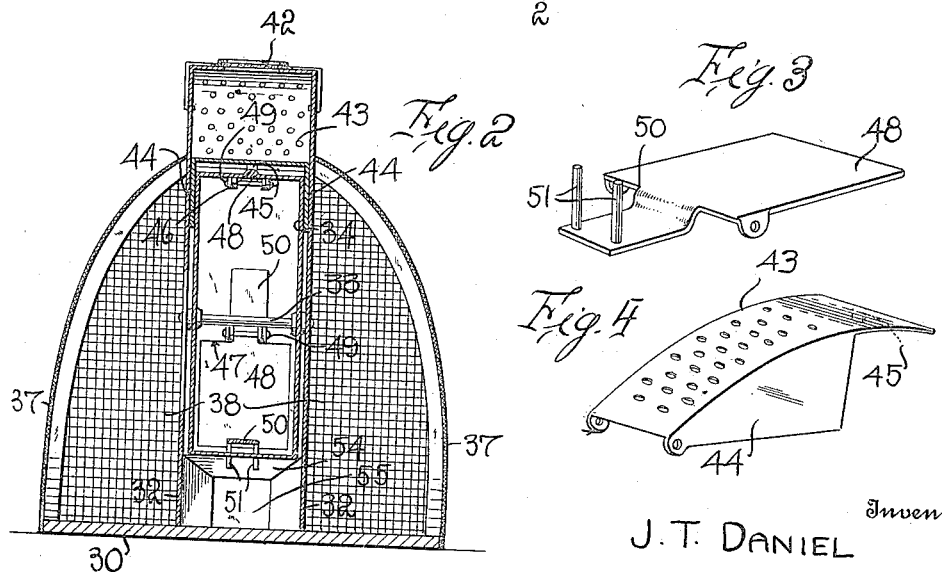
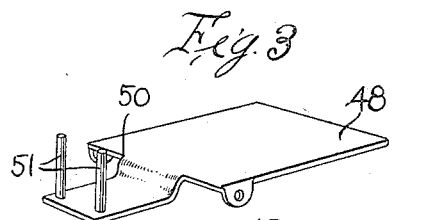
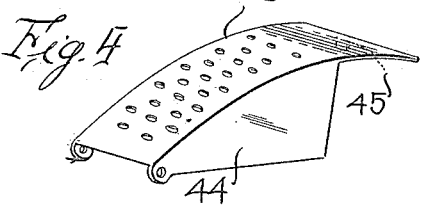
Inventor
J. T. DANIEL
By Watson E. Coleman
Attorney

J. T. DANIEL.
RAT TRAP.
APPLICATION FILED JULY 1, 1916.

1,222,606.

Patented Apr. 17, 1917.
2 SHEETS—SHEET 2.

Inventor
J. T. DANIEL
By Watson E. Coleman
Attorney

UNITED STATES PATENT OFFICE.

JOHN T. DANIEL, OF COLUMBIA, TENNESSEE.

RAT-TRAP.

1,222,606.

Specification of Letters Patent.  Patented Apr. 17, 1917.

Application filed July 1, 1916. Serial No. 107,100.

*To all whom it may concern:*

Be it known that I, JOHN T. DANIEL, a citizen of the United States, residing at Columbia, in the county of Maury and State of Tennessee, have invented certain new and useful Improvements in Rat-Traps, of which the following is a specification, reference being had to the accompanying drawings.

This invention relates to trapping devices and particularly traps designed for catching small animals such as rats, mice and birds though the trap may be adapted to catch larger animals by increasing its size.

The general object of my invention is the provision of a very simple and effective trap of this character from which the animal cannot possibly escape and which automatically sets itself so that a number of rats or other animals may be caught one after the other.

Another object of the invention is the provision of a trap so constructed that the trap must be tripped in order for the animal to get at the bait.

Other objects will appear in the following description.

Three forms of my invention are illustrated in the accompanying drawings wherein:—

Figure 1 is a vertical sectional view of one form of trap;

Fig. 2 is a vertical sectional view at right angles to Fig. 1, taken on the line 2—2 of Fig. 1;

Fig. 3 is a perspective view of one of the trip members 48;

Fig. 4 is a perspective view of the plate 43;

Figure 5:
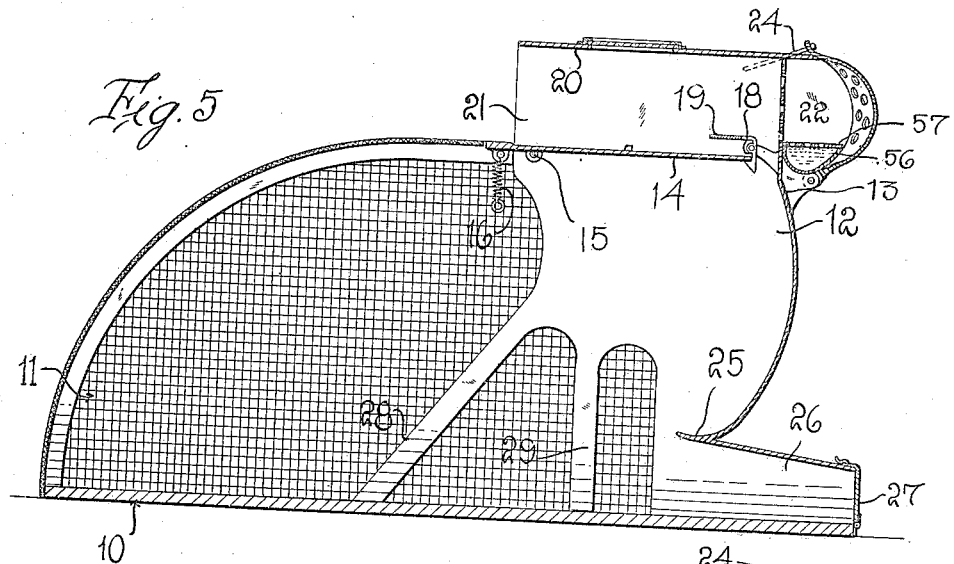
Fig. 5 is a longitudinal sectional view of another form of trap.

In these drawings I have shown four different forms of trap to indicate that my invention may be applied in different ways. In Fig. 5, 10 designates a base of any suitable material upon which is mounted the body of the trap which is formed of wire netting 11 or other suitable material, this wire netting being suitably braced so as to retain its general form. At the back of the trap is the housing 12 of sheet metal, preferably imperforate, the front of the trap being spaced from the back of this sheet metal chamber, this back being designated 13. Pivotally supported at the extremity of the front of the trap, is a drop plate 14 which is pivoted at 15 and extends rearward of its pivotal point and this rearwardly extending portion of the drop plate is connected to a spring 16 which tends to cause the drop plate to rise. This spring is, however, weak enough to permit the drop plate to fall under the weight of an animal.

Pivotally supported upon a bracket 17, depending from the rear end wall 13, is a latch 18 which engages with the forward edge of the drop plate and this latch is formed with a treadle 19. The treadle 19 and the latch 18 may be made in one piece and so weighted that they will naturally swing to a vertical position so that the latch 18 will be disposed beneath the free edge of the plate 14. The latch 18 is made with an upwardly and forwardly beveled forward edge face so that the drop plate or trap plate 14 in rising, will shift the latch rearward so that the forward edge of the trap plate will pass the latch.

Arching over the drop plate 14 and over the treadle is a wall 20 forming part of the housing, defining a passage-way 21 and at the rear end of this passage-way there is disposed a bait box or bait receptacle 22. Preferably this bait receptacle has a closure 22ª hinged as at 23 to the rear wall 13 so that it may be opened outward to permit the insertion of bait. Preferably the front wall of the bait receptacle is perforated or foraminous. The closure to the bait receptacle is held in operative position by means of a latching bail 24. Preferably, also, the upper wall of the member 20 which arches over the passage-way 21 is made of glass or wire netting. At the lower end of the rear wall 13 and spaced from the bottom 10, is a fender 25 or baffle to prevent rats or other animals from climbing up the rear wall 13 in an effort to escape. Extending from the rear wall 13 is a passage-way 26 having a door 27 normally closed and through this door the rats or other animals trapped can be ejected. The structure of the trap is suitably braced by braces 28 and 29.

The operation of this form of trap will be obvious. The animal scenting the bait in the bait box 22 climbs up on the trap whose body is formed preferably of wire netting and enters the passage-way 21 and, in order to reach the bait, is obliged to step upon the treadle 19, whereupon the latch 18 is disengaged from the free edge of the door of the drop plate 14 and the weight of the rat causes the plate to drop against the action of the spring 16 and precipitates the rat into the chamber 11, whereupon the spring 16 immediately causes the door to close and again the latch. The trap, therefore, sets itself automatically. The rats or other animals cannot gain access to the door of the trap or to the latch for the reason that the housing 12 has side walls which extend forward into the body of the trap and the rear wall 13 of this chamber is of smooth imperforate metal.

In Fig. 1, I have shown another form of trap. In this figure, 30 designates the base of a trap which may be made of metal or other suitable material and mounted upon this base by means of the braces 31 and 32 is a transverse shaft 33 upon which is rotatably mounted a rectangular box 34 preferably made of sheet metal and whose detailed construction will be later stated. Extending over the rear portion of this rotatable box 34, is a housing 35 of sheet metal having sides which extend partly downward over the sides of the sheet metal box 34 and having a rear end wall 35ª which is illustrated as outwardly bowed so as to permit the rotation of the box 34.

The body of the trap is formed preferably of wire netting and has a front wall 36ª, side walls 37 and rear walls 38 disposed on each side of the side walls of the housing 35. The front wall 36 extends in an incline upward to one corner of the rotatable box 34. The housing 35 extends upward above and arches over the rear portion of the rotatable box 34 so as to form a passage-way 39 which extends rearward to the rear wall 38 and formed at the rear end of this passage-way is a bait receptacle 40, this receptacle having perforations in its front wall. The corner 41 of the bait receptacle is latched in its closed position by means of a U-shaped bail. Preferably the top of the passage-way 39 is provided with a section 42 which is transparent.

Pivotally mounted at the rear end of the front wall 36 and disposed in the opening of the body of the trap, formed between the rear end of the front wall and the forward end of the passage 39, is a plate 43 which has depending side flanges 44 constituting fenders. This plate 43 is of a length sufficient to cause it to project into the passage-way 39 when the plate is in a horizontal position. When in its normal position, the plate rests upon one of the faces of the square rotative box 22, as illustrated in Fig. 1, and the plate is provided with a tooth 45 which engages with a detent 46 carried upon each side face of the box. This detent prevents the rotation of the box when a rat is resting upon one face of the box in the passage-way 39.

Each side face of the box is cut-away as at 47 at the forward end of the face and mounted in this cut-away portion is a treadle 48 pivoted at 49 and having an arm 50 extending rearwardly and provided with a pair of upwardly extending pins 51 adapted to engage the forward end of the plate 43. Now, when a rat moves into the passage-way 39 in an effort to get the bait in the bait receptacle, the rat will step upon the treadle 48 and depress it. This will cause the pins 51 to move upward, lifting the forward end of the plate 43 and disengaging the detent 46 from the pin 45, whereupon the weight of the rat will cause the box to rotate and the rat will be precipitated into the chamber 35.

In order to prevent the rat from climbing back out of the chamber 35 between the wall 36 and the adjacent face of the box, I provide a spring 52 which is attached to the wall 36 and extends downward and toward the lower corner of the box and also extend this wall 36 inward as at 53 to form a baffle. Below this baffle the housing 35 is rearwardly extended, as at 54 to form an exit passage and the end of this passage is closed by a door 55 provided with any locking or latching devices.

The operation of this trap is obvious from what has gone before. Normally the trap is in the position shown in Fig. 1 and the trap is set. Now, if a rat, bird or any other small animal scenting the bait enters the passage 39, the animal will depress the treadle 48 and cause the rotation of the box 34 which will precipitate the animal into the collecting chamber 37. The rotation will be sufficient to carry the box around through a quarter circle and cause the plate 43 to again engage a tooth 45 on the side of the box, again setting the trap. As the box rotates, the plate 43 rises to the position shown in dotted lines in Fig. 1, thus closing the outlet from the passage 39 and additionally preventing the escape of any trapped animal or the admission of any animal into the passage 39, while the box is rotating. The spring 52 in the rear end of the housing 35 is sufficiently bent as to permit the corner of the box to pass the spring but only enough not to impede the rotation of the box.

These traps are very simple, may be cheaply made and are very effective in practice.

Figure 6:
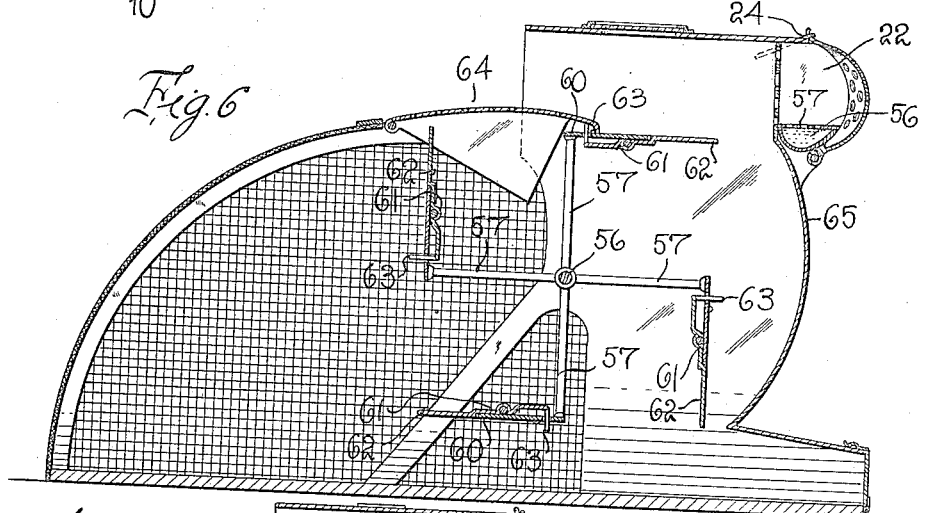
Fig. 6 is a like view to Fig. 5 but showing still another form of trap.

In Fig. 6 I show a slightly modified form of my construction which operates on exactly the same principles as that shown in Fig. 1. In this case, however, instead of the rotatable element having a box-like form, the rotatable element comprises a shaft 56 having radially extending arms 57, each arm at its end being formed with a platform 60 extending at right angles to the arm, each platform being provided upon its under face with a tripping lever 61, unequally pivoted, having a tread plate 62 at one end, and an upwardly extending member 63 at the other end which is adapted to engage beneath a pivoted plate 64. The body of the trap is practically the same as that illustrated in Fig. 1. The housing is designated 65 and is the equivalent of the housing 35. The operation of this form of trap is exactly the same as that previously described. When the rat steps upon the tread plate it releases the rotatable element which rotates and throws the rat into the passage way through which it descends into the chamber and the trap is again automatically set.

Figure 7:
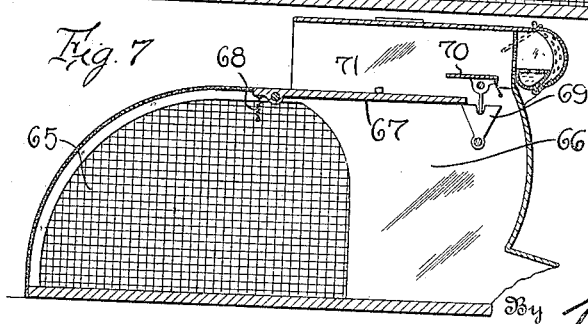
Fig. 7 is a fragmentary longitudinal sectional view showing a modification of the construction illustrated in Fig. 5.

While I have illustrated four forms of my invention which have been found very practical and efficient, yet it is obvious that many changes may be made in the details of construction without departing from the spirit of the invention. Thus in Fig. 7 I show a modification of the construction shown in Fig. 5 which I believe to be particularly effective. In Fig. 7, 65 designates the body of the trap which is constructed like that shown in Fig. 5 and 66 designates the housing. Disposed in the upper portion of the body and pivotally mounted thereon is the trap door or platform 67 which is urged to a horizontal position by means of a spring 68 but is adapted to be depressed under the weight of an animal. The platform 67 or trap door is held from depression by means of the latch 69 which is pivoted to the walls of the housing, this latch having a notch in its upper edge. Pivotally supported above the platform 67 is a treadle 70 having a downwardly extending arm engaging in the notch of the latch 69. When a rat or other animal enters the passage way 71 in order to get the bait contained in the bait box, it will bear its weight upon the treadle 70, thus shifting the member 69 rearward releasing the door 67 which drops and discharges the rat into the body of the trap. A spring 72 brings the treadle back to its normal position and the platform 67 is drawn back to its normal position by means of the spring 68 and is once more engaged by the latch in an obvious manner.

While I do not wish to be limited to any particular form of bait receptacle, I preferably provide the bait receptacle with a cup 56, as illustrated in all the different forms of my invention, this cup containing water as I find that water is an excellent bait for rats. This cup is preferably covered by a perforated plate 57.

Having thus described this invention, what is claimed is:—

1. A trap comprising a hollow body, a housing having side walls extending downward into the body and above the body and connected by an arched portion forming a passageway, the rear of the housing being closed by a wall, a pivoted supporting member disposed within said housing below the arched portion thereof, a latch holding the member in a set position, a treadle engaging the latch to release it and thereby release the supporting member to permit it to turn and discharge through the housing into the body of the trap, means for supporting bait at the rear end of the housing below the arched portion, and suitable baffles disposed on the rear wall of the housing for preventing the trapped animals from climbing up the walls of the housing.

2. A trap comprising a hollow body, a housing disposed in and projecting above the hollow body and comprising side walls, a top wall and a back wall, a bait receptacle mounted upon the rear wall adjacent the top wall, a pivoted supporting member mounted between the side walls of the housing and extending through the housing toward the rear end thereof and movable in a plane parallel to the side walls of the housing, a latch holding said member in a horizontal position, and a treadle engaging the latch to release it and thereby release the supporting member and permit the discharge of the animal through the housing into the body of the trap.

3. A trap of the character described including a chamber, a rotatable element having a plurality of treadles disposed in succession on the element, a hollow housing discharging into the chamber and having its mouth disposed above and arching over a treadle when the rotatable member is in a set position, said rotatable element rotating in a plane parallel to the side walls of the housing, means for latching the rotatable element in a set position, means actuated by the weight of an animal on the treadle releasing said latching means, and bait supporting means disposed in said housing inward of the mouth thereof and beyond said rotatable element.

4. A trap of the character described including a hollow body, a shaft extending through the hollow body, a rotatable element mounted upon said shaft and comprising a plurality of supporting members disposed in angular relation to each other, a hollow housing open at its upper end and at its lower end discharging into the body, said supporting members being adapted to be disposed successively in said open end to partly fill the same, trip levers mounted in connection with each supporting member, and having tread plates connected thereto at one end, a plate hinged to the upper end of the body extending partly across the opening thereof and normally resting on and having latching engagement with the supporting member and adapted to be moved from its latching engagement by a depression of a corresponding tread plate and the corresponding actuation of the trip lever thereby permitting a rotation of the rotatable element, a guide-way or duct discharging into the lower portion of the body and having its mouth disposed to arch over the tread plate when the rotatable element is latched, and bait holding means disposed in said guide-way.

5. In a trap of the character described, a hollow body, a platform pivotally mounted upon the hollow body, and latching means preventing the rotation of the platform upon its pivot, said platform having an extension formed with an upwardly projecting member engaging said latching means, the depression of the forward end of the platform under the weight of an animal causing the upward movement of the rearward extension and the release of said latch.

In testimony whereof I hereunto affix my signature in the presence of two witnesses.

JOHN T. DANIEL.

Witnesses:
J. O. CHEEK,
ROY SMITH.

Copies of this patent may be obtained for five cents each, by addressing the "Commissioner of Patents, Washington, D. C."